Jan. 24, 1928.  1,657,335

C. E. F. AHLM

WINDSHIELD WIPER

Filed June 27, 1923  3 Sheets-Sheet 1

INVENTOR
Charles E. F. Ahlm,
By Baker & Macklin,
ATTORNEYS

Jan. 24, 1928. 1,657,335
C. E. F. AHLM
WINDSHIELD WIPER
Filed June 27, 1923   3 Sheets-Sheet 2
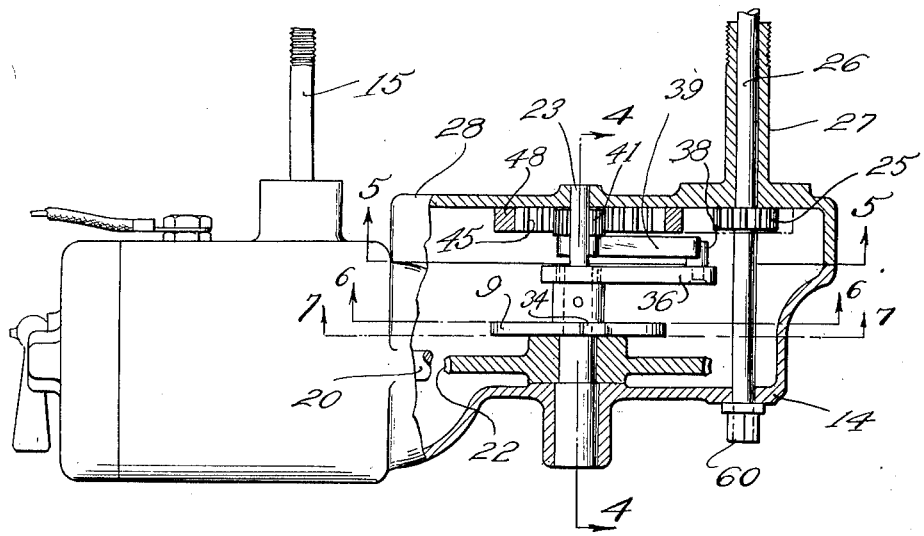

Jan. 24, 1928. 1,657,335
C. E. F. AHLM
WINDSHIELD WIPER
Filed June 27, 1923   3 Sheets-Sheet 3

INVENTOR
Charles E. F. Ahlm,
BY Baker & Macklin,
ATTORNEYS

Patented Jan. 24, 1928.

1,657,335

UNITED STATES PATENT OFFICE.

CHARLES E. F. AHLM, OF CLEVELAND HEIGHTS, OHIO.

WINDSHIELD WIPER.

Application filed June 27, 1923. Serial No. 647,965.

This invention relates to apparatus adapted for automatically cleaning the windshield of an automobile.

A construction frequently employed on windshield cleaners which are automatically operated comprises a cleaning element which is regularly oscillated so long as the source of power is operatively connected to the cleaning element. I have found that this regularity of operation is an annoyance to the driver of the vehicle, tiring his eyes, while being unnecessary for maintaining the windshield sufficiently clean to permit satisfactory vision.

One of the objects of my invention is the provision of means for effecting a period of rest after the cycle of oscillation whereby an unobstructed vision may be obtained between the cycles or periods of oscillation, and the strain on the driver's eyes relieved.

Another object of my invention is the provision of mechanism which may be simple and effective in operation and which may be so compact as to permit installation on the frame of a windshield, without obstructing the vision of the driver when the cleaning element is not in operation.

The accompanying drawings and the following description, set forth in detail certain mechanism embodying my invention. The means disclosed however, is but illustrative of the various mechanical forms in which the principle of my invention may be used.

Figure 1:
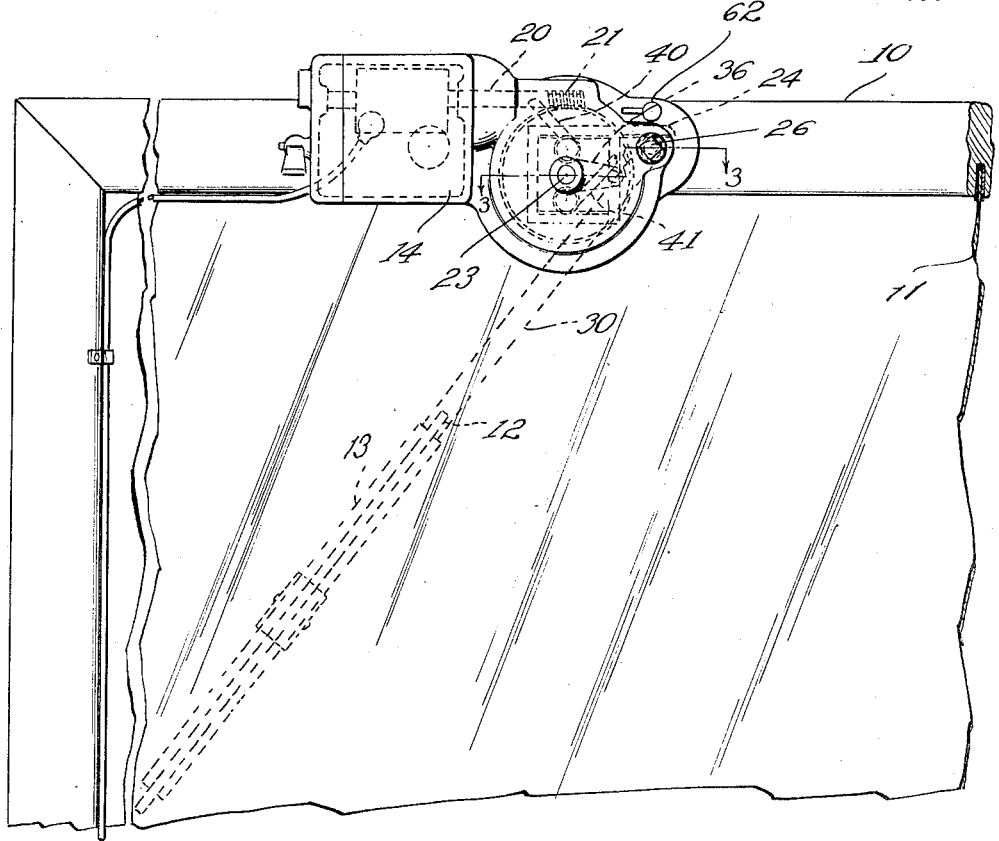
Figure 2:
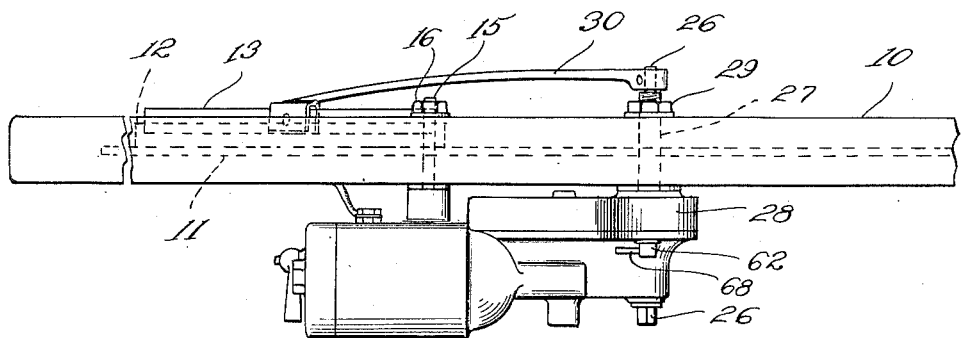
Figure 6:
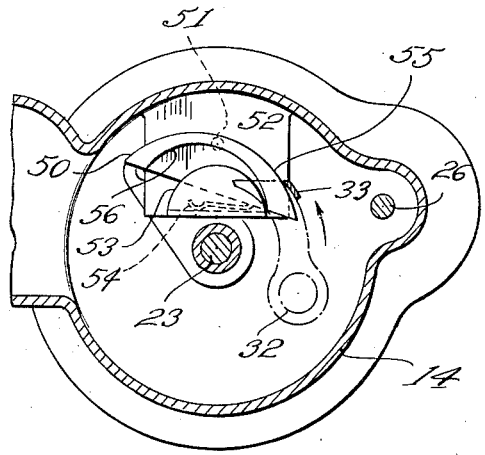
Figure 7:
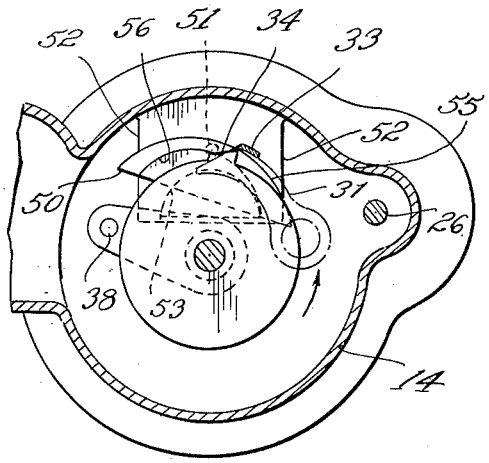
Figure 8:
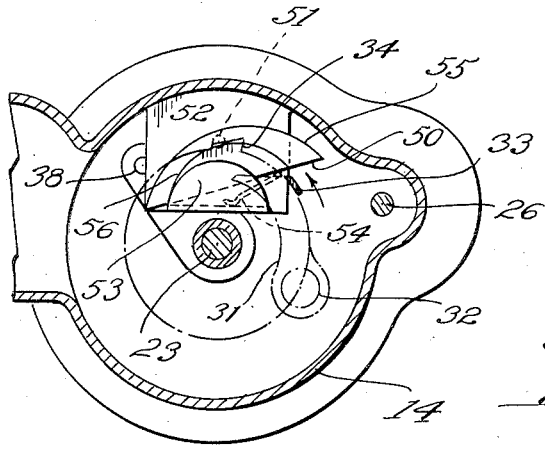
Figure 10:
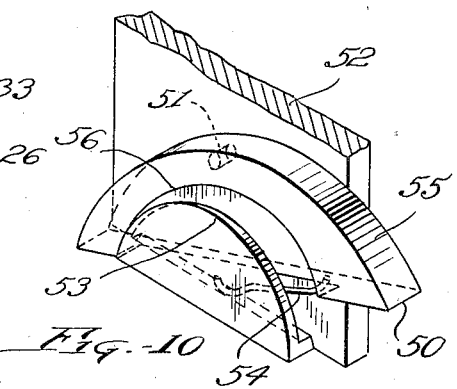
Figure 9:
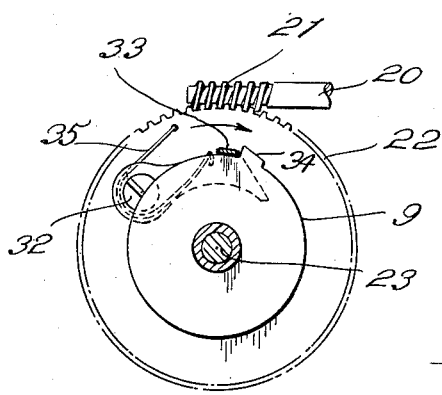
Figure 11:
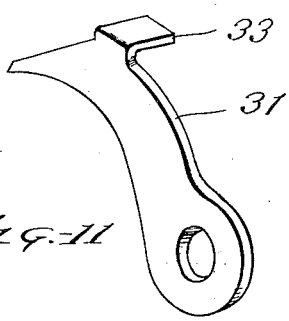

In the drawings, Fig. 1 is an elevation of a portion of a windshield having my invention attached thereto; Fig. 2 is a plan view of the mechanism shown in Fig. 1; Fig. 3 is a plan view partly in section of the apparatus for driving the cleaning element; Figs. 4 and 5 are sectional views taken on the correspondingly numbered lines in Fig. 3; Figs. 6 and 7 are sectional views taken on the correspondingly numbered lines in Figs. 3 and 4 respectively; Fig. 8 is a sectional view similar to Fig. 6 but showing another position of the operating mechanism; Fig. 9 is a section on the line 9—9 in Fig. 4; Fig. 10 is a perspective view of a tripping device constituting part of the operating mechanism; and Fig. 11 is a perspective view of an operating pawl; and Fig. 12 is a section on the line 12—12 in Fig. 5.

My invention is illustrated as mounted on a frame 10 which carries a pane 11 of an automobile windshield. A cleaning element or wiper is illustrated at 12 on the outer side of the pane and as being carried in a cleaning bar 13 which is arranged to be oscillated automatically when the mechanism which will be hereinafter described is set in operation.

The source of power for operating the cleaning element is illustrated as a motor which is mounted within a casing 14. The preferred manner of connecting the casing to the frame comprises a bolt 15 which extends through the frame and is locked thereto by means of a nut 16. Mechanism intermediate the motor and the cleaner device is employed for so actuating the cleaner that a period, or cycle of rest occurs after each cycle of oscillation while the motor operates at a constant rate of speed.

The preferred mechanism is illustrated as being operatively connected with the armature shaft 20 of the motor which is extended and is provided with a worm 21. A worm wheel 22 loosely mounted on a shaft 23 meshes with the worm. The shaft may be supported on one end by the casing 14 and on the other end by a cover 28, and is adapted to carry mechanism for intermittently operating a rack 24, which in turn controls the operation of a pinion 25. This pinion may be rigidly connected to a shaft 26, which is shown as supported at one end by the casing 14, and on the other end by a bearing 27. This bearing extends through an opening in the frame 10 and is preferably threaded to receive a nut 29 for locking the cover thereto. The casing and cover therefore cooperate to house the driving mechanism. To connect the shaft 26 with the wiper, I have shown an arm 30, one end of which is rigidly connected to the shaft and the other end of which is attached to the cleaner bar 13.

To effect an intermittent connection between the worm wheel 22 and the shaft 23, and thereby to obtain an intermittent operation of the cleaner, I have shown a pawl 31 which may be pivoted at 32 to the side of the worm wheel and may be provided with an extension 33. The extension projects laterally over the periphery of a disc 9 which is rigidly mounted on the shaft 23. The disc may have a projection which provides a shoulder 34 against which the extensions 33 may engage for effecting a driving connection with the disc when the worm wheel is rotated. The pawl is normally held against the periphery of the disc by a spring 35 as illustrated in Fig. 9. Normally then, rotation of the worm wheel 22 will effect rotation of the shaft 23 so long as the pawl is in engagement with the shoulder on the disc.

To translate rotary motion of the shaft 23 into reciprocatory motion of the rack 24, I have shown an arm 36 which is rigid on a hub 37. This hub is shown as integral with the disc 9 wherefore the arm 36 is rotated simultaneously with the disc. This arm may have a pin 38 adjacent the outer end thereof, for engaging arms 39 and 40 which are rigidly attached to pinions 41 and 42 respectively. These pinions are supported on shafts 43 and 44 respectively which as shown in Fig. 4 are carried by the cover 28. These pinions moreover, mesh with inwardly facing rack teeth 45 and 46 respectively. The rack teeth 45 are illustrated as being on an extension of the rack 24, while the teeth 46 are shown on a bar 47 which is connected to the bar 24 by connecting strips 48 and 49. Thus the rack teeth and connecting strips comprise a box-like member which encloses the pinions.

The operation of the mechanism for translating rotary motion of the shaft 23 into reciprocatory motion of the rack 24 may be described by referring to Fig. 5, wherein the shaft is illustrated as being rotated in a counter-clockwise direction, and wherein the pin 38 is just clearing the end of the arm 39, after having moved it in a counter-clockwise direction. During such engagement the rack 24 has been moved to the right, while the arm 40 has been moved in a clockwise direction by reason of the fact that the pinion 42 is in mesh with the rack teeth 45. The length of the arm 39 is such that the pin 38 clears the end thereof just as the arm 40 is about to engage the arm 39. Continued rotation of the shaft 23 then causes the pin 38 to engage the arm 40 and to revolve it in a counter-clockwise direction, thereby moving the rack to the left. The arm 40 is engaged by the pin 38 until it is moved to the position shown by the broken lines 40$^a$ whereupon the pin 38 clears the end of the arm and is again in position to engage the arm 39 which in the meantime has been moved to the position indicated by the broken line 39$^a$ by reason of the engagement between the pinion 41 and rack teeth 45. The rack 24 is therefore reciprocated so long as the shaft 23 is rotated, while the shaft 23 as heretofore described is rotated so long as the pawl engages the shoulder 34 on the disc 9.

To provide for intermittent operation of the disc, I may employ a trip member 50 which is shown as pivoted at 51 to an apron 52, which extends downwardly from the casing 14. A suitable extension 53 provides a guide for the member 50 while a spring 54 serves to retain the member in the desired off-center position. The spring as shown, has one end thereof attached to the member and the other end thereof slidably engaging the face of the extension. The member moreover has an arcuate bearing surface 55 on the outer side thereof and a curved bearing surface 56 on the inner side thereof. These curved surfaces are adapted to be alternately engaged by the pawl on each rotation of the worm wheel 22. The alternate engagement is effected by reason of the fact that the member 50 is moved about the pivotal connection therefor whenever the extension engages the far side of the trip member.

The operation of the tripping device will be readily understood if reference is had to Fig. 6 wherein the pawl is shown as engaging the near end of the surface 55. The arrow shows that the shaft 23 is being rotated in a counter-clockwise direction, wherefore the pawl will be raised as it approaches the middle of the trip lever 50, while still being in engagement with the shoulder on the disc 9. As the pawl is revolved further to the position shown in Fig. 7, the pawl clears the shoulder on the disc whereupon the friction between the wiper and the pane causes the disc to stop rotating. Continuous rotation of the worm wheel 22 however, causes the extension 33 on the pawl to pass over the pivotal connection 51, and then to engage the far side of the surface 55. The spring 35 associated with the pawl thereupon urges the far surface of the member 50 downwardly until the spring 54 carried by the member is moved past the dead center position. Thereupon the spring 54 will force the far end of the member 50 downwardly, thus causing the member to assume the position shown in Fig. 8.

Assuming now that the pawl is again brought to the near end of the tripping device, then as shown in Fig. 8, the extension 33 on the pawl engages the inner curved surface 56 on the near end of the trip member. The shape of this surface causes the extension to again engage the shoulder on the disc whereupon the disc is rotated with the worm wheel. As soon as the pawl engages the far end of the inner surface, however, then such end is forced outwardly since the periphery of the disc prevents the pawl from moving inwardly. This outward movement of the trip member is continued until the spring 54 passes beyond the dead center position, whereupon the tripping member is forced to the position indicated in Fig. 6. Thus the disc is rotated a complete revolution and is again released during the succeeding revolution of the pawl. The extension 33 then engages the outer surface 55 of the tripping member. Thus the disc is rotated one revolution with each alternate revolution of the pawl. Accordingly, the wiper completes a cycle of oscillation by means of the mechanism heretofore described whenever the disc is rotated a complete revolution.

The mechanism heretofore described is effective for causing automatic operation of the wiper whenever current through the motor is turned on. To effect manual operation of the wiper, however, I provide means for disconnecting the shaft 26 from the motor actuated mechanism, and I shape the outer end of the shaft 26, as at 60, to receive a crank or lever which is applied by the operator. The preferred means for disconnecting the shaft 26 from the automatically operated mechanism comprises an eccentric 61 mounted on a shaft 62, which is supported partly by the casing 14 and partly by the cover 28. A slide 63 movable in guide-ways 64 which may form part of the cover 28 is controlled by operation of the eccentric, and is adapted by such movement to move the rack 24 toward and away from the pinion 25. The preferred arrangement for accomplishing this comprises a pin 64, which projects laterally from the slide and is adapted to project into a slot 65 in the rack 24.

Normally then, the pin permits reciprocation of the rack and serves to hold it in engagement with the pinion 25. A suitable spring 66 on the shaft 62 may be used for urging the shaft inwardly while a projection 67 on the shaft may engage a cooperating depression in the casing 14 (not shown) wherefore inadvertent movement of the eccentric is prevented.

To actuate the shaft 62, I have shown an arm 68 which projects from the shaft outside the casing, and which enables the operator to withdraw the shaft slightly so as to free the projection 67 from the cooperating recess and subsequently to turn the shaft. Assuming that the rack is in engagement with the pinion 25, then when the arm 68 is moved in a clockwise direction as shown in Fig. 1, then the slide 64 is raised and the rack 24 is accordingly lifted out of engagement with the pinion 25. Thereupon the operator may attach a crank to the end 60 of the shaft 26 and manipulate the wiper manually.

In view of the foregoing description, it will be seen that my invention provides a mechanism for effecting a period of rest in the operation of a windshield wiper, wherefore the annoyance caused by the regularity of oscillation is eliminated. The mechanism illustrated provides a compact structure which may be readily mounted on the frame on a windshield without obstructing the vision of the driver, and which may be satisfactorily installed on existing windshield frames without requiring changes in the construction thereof.

Having thus described my invention, I claim:—

1. In a device of the class described, the combination with a reciprocating cleaning member, of a rotary driving member, and means controlled by the driving member for operatively connecting said members for one complete revolution of the driving member to cause the cleaning member to move through a complete cycle of operation, then disconnecting them for a succeeding complete revolution, and thereafter reconnecting them.

2. In a device of the class described, the combination with a reciprocating cleaning element, a member constantly connected to the element to reciprocate it and rotatable once for each reciprocation, a constantly rotating driving member, and pivoted interengaging means between the driving and driven members for establishing a connection between these members on one rotation of the driving member and interrupting such connection during the next rotation whereby the cleaning element makes one complete reciprocation and then stops for an appreciable period to allow water to drip from the element.

3. In a device of the class described, the combination with a frame, of rotary driving and driven members carried thereby, a reciprocating cleaning element operatively connected with the driven member, means for effecting an engagement between said members during alternate revolutions of the driving member to provide a dwell in the action of the cleaning element, the interval of dwell corresponding substantially to the time required for one complete revolution, and mechanism for transforming rotary motion of the driven member into reciprocating motion of said element, said mechanism being arranged to afford one complete reciprocation of the element for each rotation of the driven member.

4. In a device of the class described, the combination with a cleaning element, of a shaft, a rotary driving member on the shaft, a rotary driven member loose on said shaft, means carried by the driving member for effecting an engagement with the driven member on different complete revolutions of the driving member whereby said driven member is rotated intermittently, and means operatively connecting the driven member with said element.

5. In combination a reciprocatable cleaning element, a rotary driving member, an interruptable driving connection therebetween in which one rotation of the member is sufficient to cause a complete reciprocation of the element, said interruptable connection comprising a pawl on the driving member, a member constantly connected to the element and adapted to be engaged by the pawl and an intermediately pivoted shift lever arranged to engage the pawl to move it to disengaging position on one rotation of the driving member and to permit it to reengage on the next rotation.

6. In a device of the class described, the combination with a cleaning element, of a rotary driving member, means for rotating said member at a constant speed, a pawl carried by the driving member, means for moving the pawl relatively to the member on each revolution thereof, a driven member adapted to be engaged by the pawl on each alternate revolution of the driving member whereby the driven member is alternately active and idle and mechanism for transmitting the rotary motion of the driven member to oscillating motion of said element.

7. In combination, a cleaning element, a shaft, rotary driving and driven members mounted on said shaft, a shift lever having inner and outer bearing surfaces, a pawl carried by the driving member and adapted to engage the inner and outer surfaces respectively upon alternate revolutions of the driving member, said pawl being arranged to connect the driving and driven members when engaged by one surface of the pawl and to disconnect the members when engaged by the other, whereby the driven member is idle on alternate revolutions of the driving member, and means operatively connecting the driven member with said element.

8. In combination, a cleaning element, a rotary driving member, a pawl carried by the member and a member connected with the element and arranged to be engaged by the pawl, and means for causing the pawl to be disengaged during one rotation of the driving member and to be reengaged on the next rotation comprising a pivoted member having a cam surface for engaging the pawl to move it to disengaged position and a cam surface for subsequently engaging the pawl to reposition the pivoted member in such manner that the first mentioned surface will clear the pawl on the next rotation of the driving member.

In testimony whereof, I hereunto affix my signature.

CHARLES E. F. AHLM.